Sept. 11, 1928.  G. R. PENNINGTON  1,684,070
MOTOR VEHICLE
Filed May 29, 1922   4 Sheets-Sheet 1
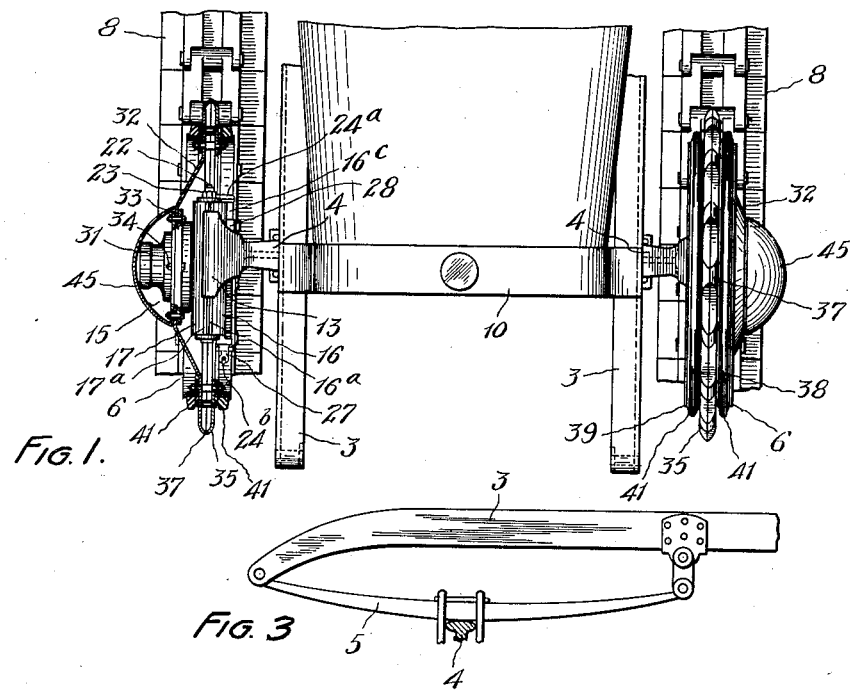
FIG. 1.
FIG. 3.
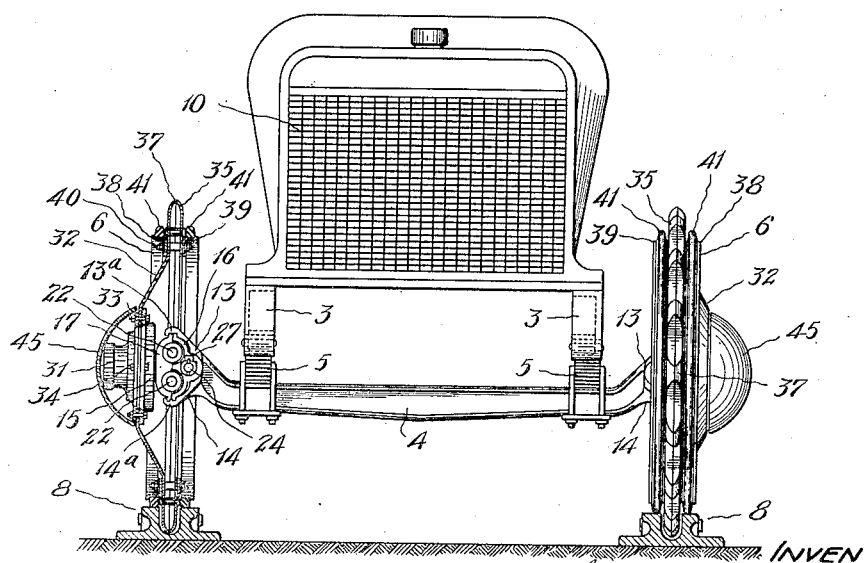
FIG. 2.
INVENTOR:
Gordon R. Pennington
BY Ray F. Fehr
ATTORNEY.

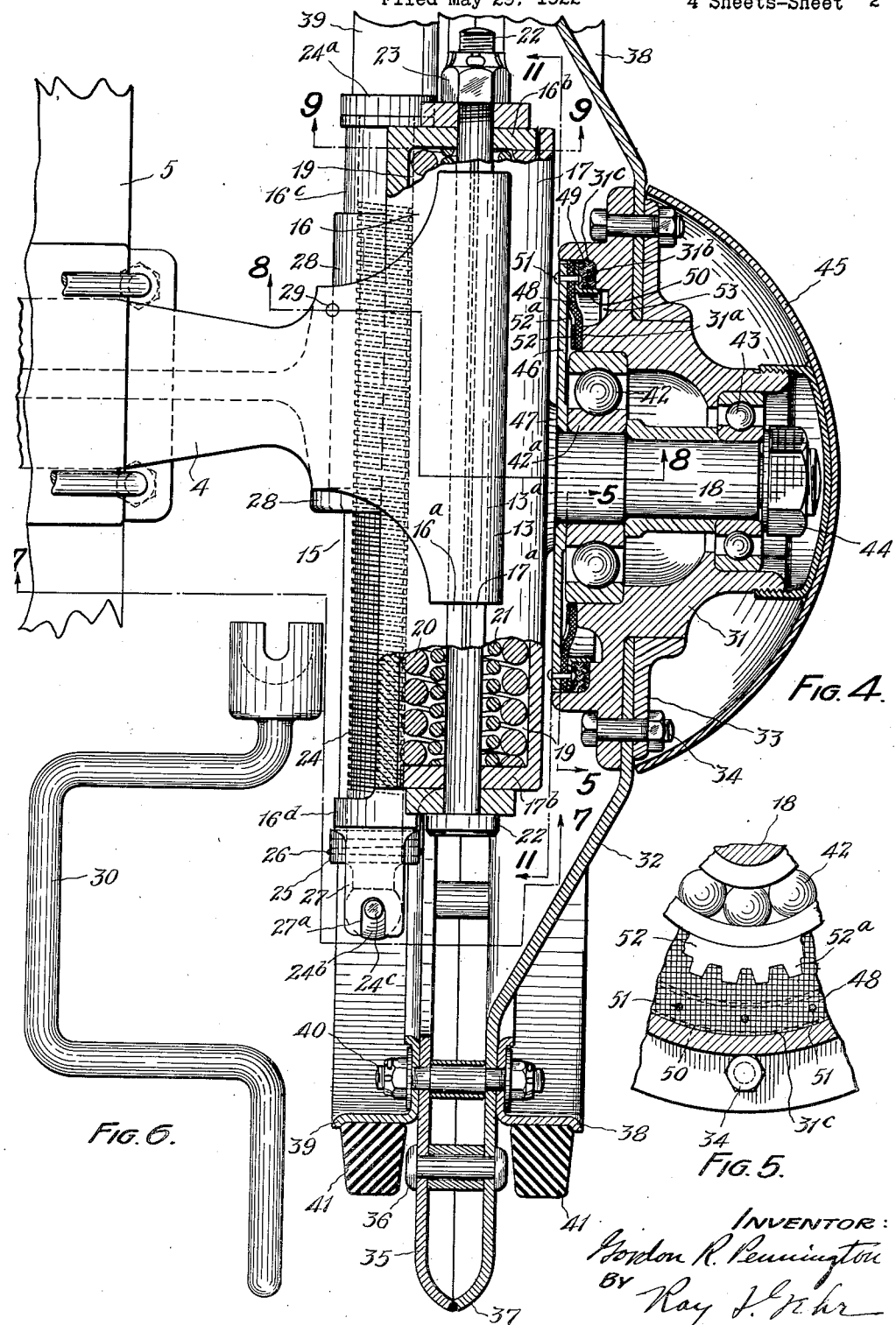

Sept. 11, 1928.  
G. R. PENNINGTON  
1,684,070  
MOTOR VEHICLE  
Filed May 29, 1922 4 Sheets-Sheet 3

INVENTOR:
Gordon R. Pennington
BY Ray A. Fehr
ATTORNEY

Sept. 11, 1928.  G. R. PENNINGTON  1,684,070
MOTOR VEHICLE
Filed May 29, 1922  4 Sheets-Sheet 4

INVENTOR:
Gordon R. Pennington
BY
ATTORNEY.

Patented Sept. 11, 1928.

1,684,070

UNITED STATES PATENT OFFICE.

GORDON R. PENNINGTON, OF CLEVELAND, OHIO.

MOTOR VEHICLE.

Application filed May 29, 1922. Serial No. 564,304.

The invention relates to endless track vehicles and more particularly to the wheel mounting of the endless track mechanism.

The invention has for its general object the simplification of the wheel mounting of endless track vehicles while at the same time providing means to insure the successful meeting of practical conditions encountered in service.

More particularly, a further object of the invention is the provision of improved means for bodily adjusting the idler wheel of the track-laying vehicle relative to the drive wheel so that slack in the track incident to wear in the track joints or to any other cause can readily be taken up.

Another object of the invention is the provision of an improved adjustable wheel mounting for automatically acting to prevent injurious stresses in the traction parts in case any foreign object gets between the track and one of the wheels that engage it.

Other objects of the invention more or less incidental or ancillary to the foregoing and the manner in which all of the various objects are attained will be pointed out in the following description in connection with the accompanying drawings which show a preferred embodiment of the invention.

In the drawings, Fig. 1 is a plan view of the front part of a tractor with some of the parts broken away and some of them shown in section.

Fig. 2 is a front elevation of the tractor with some of the parts broken away and in section.

Fig. 3 is a side elevation of a part of one of the side frame members and the spring and axle structure.

Fig. 4 is an enlarged horizontal fragmentary sectional view through one of the front or idler wheels of the tractor.

Fig. 5 is a fragmentary section on the line 5—5, Fig. 4.

Fig. 6 is a side elevation of a wrench adapted for use with the axle adjusting mechanism.

Figure 7:
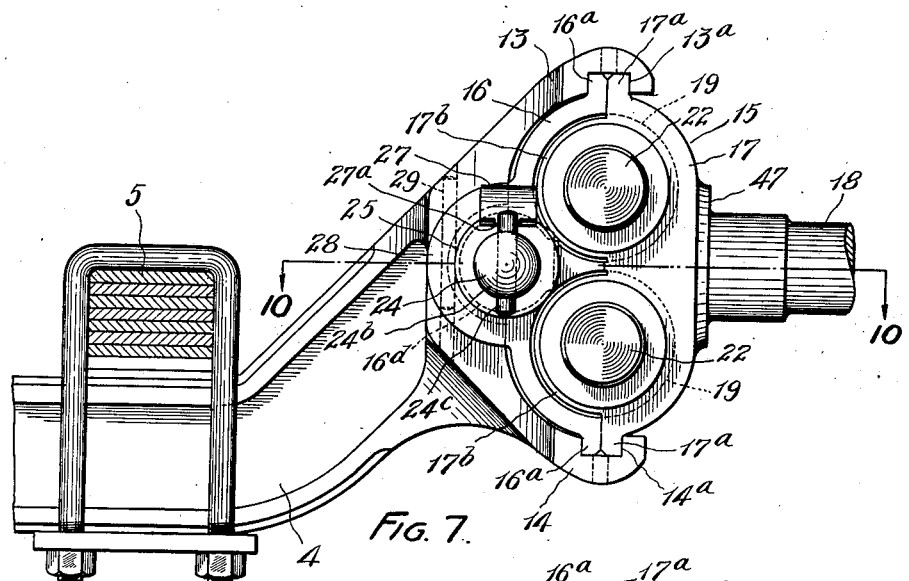
Fig. 7 is a section on the line 7—7, Fig. 4, with the wheel removed from the axle.
Figure 8:
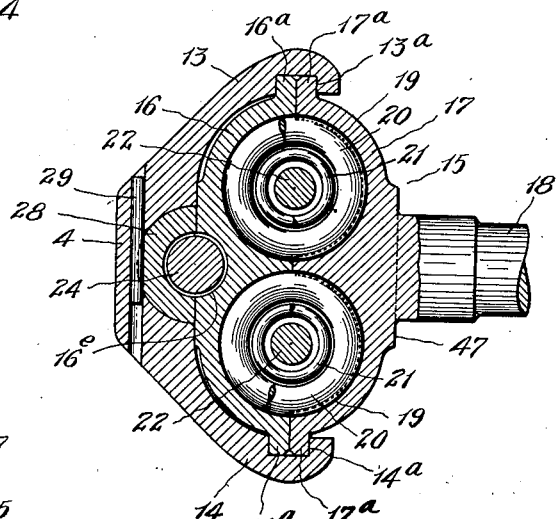
Fig. 8 is a section on the broken line 8—8, Fig. 4, with the wheel removed.
Figure 9:
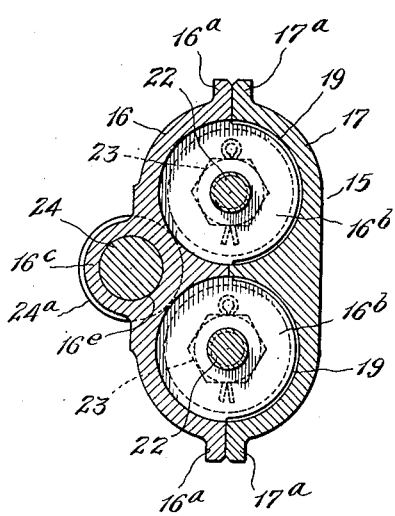
Fig. 9 is a section on the line 9—9, Fig. 4, with the wheel removed.
Figure 10:
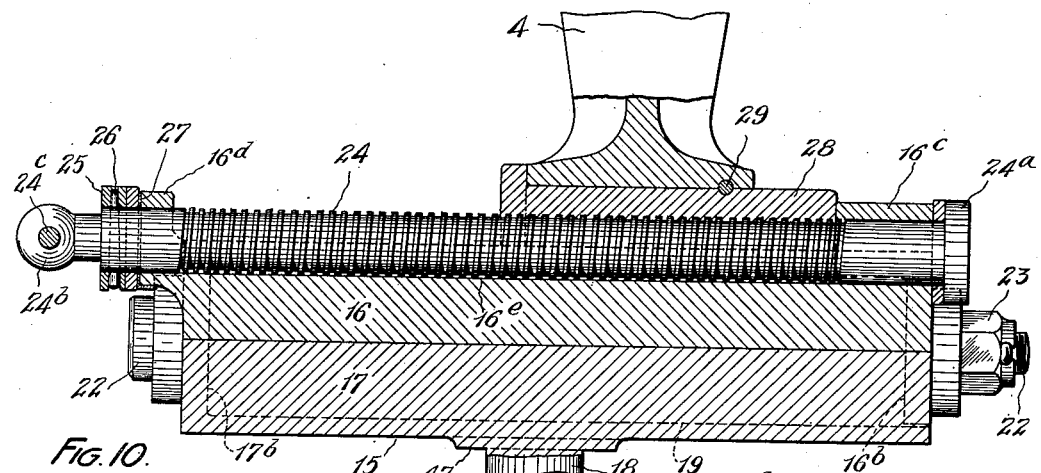
Fig. 10 is a section on the line 10—10, Fig. 7.
Figure 11:
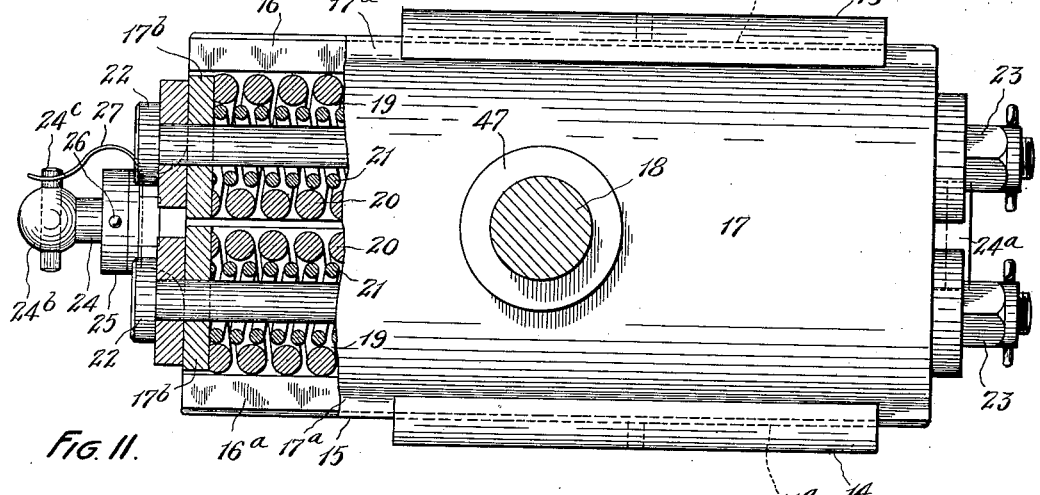
Fig. 11 is a section on the line 11—11, Fig. 4, with some of the parts broken away.

Referring now in detail to the construction illustrated and at the outset more particularly to Figs. 1, 2, 3 and 12, 1 is the engine block and 2 the gear casing bolted thereto, 3, 3 are side frame bars at the front part of the tractor, said three parts constituting the main body or frame of the tractor, and 4 is a front axle connected to said side frame members by springs 5, 5. On the front axle are mounted the main idler wheels 6, 6, the rear of the tractor being supported by the drive wheels 7, 7, the sprockets of which engage the endless track 8. Between each drive wheel and its corresponding idler 6 are arranged small idlers 9 which run on the track and help to support the machine. The drive wheel 7 can be actuated by any suitable form of drive gearing, and the idlers 9 can be mounted on the main frame of the tractor in any suitable manner. The links or shoes of the track, also, can be of any suitable construction to cooperate with the drive wheel. A radiator is shown at 10, a steering wheel at 11 and a driver's seat at 12, these, as well as various other parts of the tractor, being of any suitable construction in so far as the present invention is concerned.

The present invention relates more especially to the mounting of the front or main idler wheels themselves and in the following description relating to this mounting attention is directed more especially to Figs. 4 to 11, inclusive. In endless track tractors it is nesessary to make some provision for adjustment to take up slack in the endless track resulting from wear in the track joints or from structural variations or inaccuracies or other causes and I have sought in the present invention to satisfactorily accomplish this object by mounting the main idler wheel on an axle that is bodily adjustable in parallelism relative to the drive wheel, thus insuring in all positions of adjustment a proper alignment of the driving and idler wheels. In the construction illustrated, the front axle 4 is formed at each end with fork arms 13, 14 formed with guides 13ª, 14ª in which is slidably mounted a stub axle structure designated in its entirety by 15. The axle structure 15 comprises an inside block 16 and an outside block 17 which is formed with the stub axle 18. The two blocks 16 and 17 are formed on their upper and lower sides with abutting slides 16ª, 17ª which slidably engage the guides 13ª, 14ª. The blocks 16 and 17 are recessed on their adjacent faces to form upper and lower cylindrical chambers 19, 19 which are closed at their front ends by walls 17ᵇ, 17ᵇ integral with the block 17 and at their rear ends by walls 16ᵇ, 16ᵇ integral with the block 16. In each cylindrical recess 19 is mounted a pair of coiled springs 20, 21 with their ends abutted against the end walls 16ᵇ and 17ᵇ, respectively. These springs are initially tensioned or compressed somewhat but are held against expansion by the through bolts 22 which are secured by nuts 23.

The stub axle structure as an entirety is secured in adjusted position in the axle arms 13, 14 by means of a square threaded screw 24 which is rotatably mounted in lugs 16ᶜ, 16ᵈ on the block 16, said screw being formed at its rear end with a suitable head 24ª and being fitted at its front end with a collar 25 secured by a pin 26. The screw is also preferably formed at its front end with a spherical knob 24ᵇ fitted with a transverse pin 24ᶜ and between the lug 16ᵈ and the screw collar 25 is clamped a catch spring 27 which has its ends slotted at 27ª to engage the pin 24ᶜ. Throughout its length the block 16 is formed with a smooth semi-cylindrical recess 16ᵉ to afford a firm support for the screw. The threads of the screw opeartively engage mating threads formed in a semi-cylindrical block 28 which is secured by the pin 29 in the axle 4. By rotation of the screw 24 the stub axle structure 15 can be adjusted forward and backward at will. I prefer to provide for this purpose a wrench 30 such as shown in Fig. 6 which can be slipped over the knob 24ᵇ of the screw and by engagement with the pin 24 turn the screw as desired. The placing of the wrench on the end of the screw lifts the spring 27 to release the screw for rotation.

The idler wheel construction can be of any suitable sort but as shown the wheel comprises a hub 31 and a main web or disc 32 which is preferably pressed from sheet steel. The web 32 is secured to the hub by a ring 33 and bolts 34. At its outer periphery the web 32 has a mating rim section 35 secured thereto by rivets 36, the web 32 and the section 35 being formed to provide sprocket teeth 37. Rim flanges 38, 39 are secured to the peripheral part of the wheel by bolts 40 and on the rims 38, 39 are mounted solid rubber tires 41, 41.

The hub 31 of the wheel is rotatably mounted on the stub axle 18 with interposed ball bearings 42, 43, the wheel being secured by a nut 44 in the usual manner. The outer end of the bearing is closed by a hub cap structure 45 screwed on the end of the hub. The wheel can readily be removed from its supporting axle without dismounting or in any way disturbing the latter.

To retain the oil or grease in the bearing and prevent access of dust thereto I provide at the inner end of the hub an improved form of packing. 46 is an annular plate clamped between the shoulder 47 on the hub structure and the inner race 42ª of the main bearing. A liquid-tight connection is thus formed between the inner end of the plate 46 and stub axle or shaft part of the structure. To the outer part of the plate 46 is secured a relatively wide leather ring 48 and a felt packing ring 49. In the construction shown a flanged metal ring 50 is provided to support the felt ring 49 and this flanged ring, the leather ring 49 and the annular plate 46 are tightly connected by rivets 51. Between the inner part of the leather ring 48 and the annular plate 46 is arranged a thin metal ring 52 having resilient fingers 52ª which engage the annular plate and serve to yieldingly press the inner part of the leather ring against an adjacent face 31ª of the hub. The felt packing ring 49 slidably engages the two annular hub faces 31ᵇ and 31ᶜ. Sliding engagement between the hub 31 and the felt and leather packing rings is thus provided in separate concentric zones and the hub between these zones is formed to provide a chamber 53.

A packing of this character is structurally simple and cheap to produce and at the same time is very effective by reason of the double seal which it provides. The inner seal formed by the leather ring prevents escape of lubricant from the bearing, while the outer seal formed by the felt ring 49 serves to prevent entrance of grit to the inner working part of the leather ring that engages the hub, and thus obviates the cutting and deterioration of said leather ring which would otherwise result. A slight leakage of oil may pass the leather ring and in wet weather a little water may leak through the felt washer but in such case the oil and water simply mingle in the chamber 53 and do no harm. The felt washer effectively prevents grit from entering said chamber and as there is a constant tendency for a slight amount of oil to work out of the bearing past the leather ring, there is no danger of water gaining access to the bearing.

In the use of my improved idler wheel mounting the endless track is initially suitably adjusted by means of the screw 24 so that there is no undersirable slack. When wear occurs in the joints of the track, and it is desirable to take up the resulting slack, this is very readily accomplished by further adjustment of the screw. In the service of endless track tractors there is a tendency for foreign material to crowd between the tracks and the wheels, particularly the drive wheels and the main idler wheels because of their larger size, and when this occurs the track and the cooperating wheel and axle structures may be subjected to very severe and injurious stresses. To illustrate this I have indicated in Fig. 12 of the drawing the conditions resulting from a small stone or bowlder crowding between the track and the main drive wheel. In a case of this sort if the stone is not crushed the parts are subjected to exceedingly severe stresses and in tractors as heretofore constructed this has resulted in breakage or damage of the parts. With my improved idler wheel mounting, however, such damage or injury is entirely obviated by the yielding action of the springs 20, 21 interposed between the two main members of the stub axle structure 15. As previously stated these springs are under initial tension and this tension is great enough to resist ordinary stresses in the track and prevent any substantial movement of the axle block 17 in relation to the block 16; but when an abnormally high tension in the track occurs the springs 20, 21 yield and permit rearward movement of the axle block 17 relative to the block 16 thus preventing breakage or injury of the parts.

Figure 12:
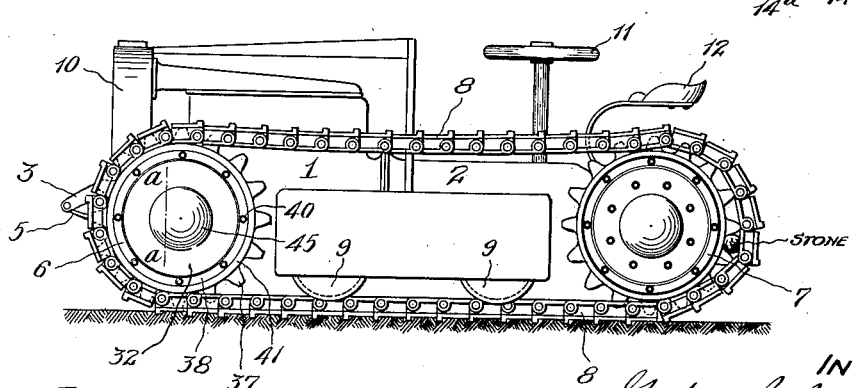
Fig. 12 is an outline view in side elevation and on a reduced scale of a tractor embodying my improvements, to illustrate the yieldable mounting of the idler wheel.

In Fig. 12 the line a—a indicates the normal position of the wheel axis and it will be noticed that the entry of the stone between the track and the drive wheel has resulted in a substantial rearward movement of the idler 6 to accommodate the conditions. As the mechanism is freed from the obstruction the idler returns to its normal position and thus maintains proper adjustment of the track.

By provision of my adjustable stub axle construction I am enabled to provide a practical endless track vehicle in which the track-engaging wheels are mounted on the main frame of the vehicle without the use of a traction frame such as is commonly interposed between the main frame and the track-engaging wheels.

In addition the stub axle construction permits the removal of the wheel without dismounting the axle itself, and consequently it is comparatively easy to remove the wheel and expose the wheel bearings in case of need.

I have shown and described preferred forms of construction of the different features of my invention but it is to be understood that there can be wide variation of the form and arrangement of parts within the scope of the appended claims.

What I claim is:—

1. In an endless track vehicle, the combination of an endless track, a pair of wheels around which the track passes, and an axle for one of said wheels comprising a part fixed in relation to the vehicle frame and a wheel-carrying part bodily adjustable relative to the fixed part to take up slack in the track.

2. In an endless track vehicle, the combination of an endless track, a pair of wheels around which the track passes, an axle structure for one of said wheels comprising a support fixed in relation to the vehicle frame, a stub axle slidably mounted on said support for adjustment toward and from the other wheel, and means for securing the stub axle in adjusted position.

3. In an endless track vehicle, the combination of an endless track, a pair of wheels around which the track passes, an axle structure for one of said wheels comprising a support fixed in relation to the vehicle frame, a stub axle slidably mounted on said support for adjustment toward and from the other wheel, and manually operable means for moving the stub axle to effect said adjustment.

4. In an endless track vehicle, the combination of an endless track, a pair of wheels around which the track passes, an axle structure for one of said wheels comprising a support fixed in relation to the vehicle frame, a stub axle slidably mounted on said support for adjustment toward and from the other wheel, and means for securing the stub axle in adjusted position comprising a resilient member adapted to yield when the tension in the track exceeds a certain value so as to permit said axle to move toward the other wheel.

In testimony whereof, I hereunto affix my signature.

GORDON R. PENNINGTON.